「(12) United States Patent
Bertleff

(10) Patent No.: US 6,959,816 B2
(45) Date of Patent: Nov. 1, 2005

(54) SWITCH FOR SORTING AND GUIDING PARTS

(75) Inventor: Wolfgang Bertleff, Erlangen (DE)

(73) Assignee: Demag Ergotech GmbH, Schwaig (DE)

( * ) Notice: Subject to any disclaimer, the term of this patent is extended or adjusted under 35 U.S.C. 154(b) by 309 days.

(21) Appl. No.: 10/332,787

(22) PCT Filed: Jun. 20, 2001

(86) PCT No.: PCT/DE01/02291

§ 371 (c)(1),
(2), (4) Date: Jan. 10, 2003

(87) PCT Pub. No.: WO02/04326

PCT Pub. Date: Jan. 17, 2002

(65) Prior Publication Data

US 2004/0016678 A1 Jan. 29, 2004

(30) Foreign Application Priority Data

Jul. 10, 2000 (DE) ........................... 100 34 432

(51) Int. Cl.[7] .................................. B07C 3/00
(52) U.S. Cl. ....................... 209/655; 209/657
(58) Field of Search ................. 209/655, 657, 209/257, 260, 908, 924, 941

(56) References Cited

U.S. PATENT DOCUMENTS 4,643,291 A * 2/1987 Counter et al. ........ 198/370.07
4,785,942 A * 11/1988 Van Leijenhorst et al. . 209/657
4,976,356 A * 12/1990 Mizuno et al. .............. 209/539
5,407,083 A     4/1995 Bertleff
5,740,901 A     4/1998 Lazzarotti et al.
5,887,699 A * 3/1999 Tharpe ........................ 198/367
5,950,842 A * 9/1999 Baur ........................... 209/540

FOREIGN PATENT DOCUMENTS

DE       1 080 481        4/1960
DE       299 06 636 U1    9/1999
EP       0 589 543 B1     3/1994

* cited by examiner

Primary Examiner—Donald P. Walsh
Assistant Examiner—Joseph C Rodriguez
(74) Attorney, Agent, or Firm—Cohen, Pontani, Lieberman & Pavane

(57) ABSTRACT

A distribution switch for sorting and guiding parts, particularly workpieces made of plastic, includes rods which are movable axially parallel to one another. The rods define paths which guide the parts in question into at least two different receiving elements while either forming a slope or leaving an opening in the center, depending on a predeterminable position of the rods. The rods correspond with guide elements through which they are movable substantially horizontally, in that drive units are provided, by which means the rods can be moved independently toward one another or away from one another along their longitudinal axes, and in that the lines can be changed in length depending on the position of the rods.

18 Claims, 5 Drawing Sheets

SWITCH FOR SORTING AND GUIDING PARTS

PRIORITY CLAIM

This is a U.S. national stage of application No. PCT/DE01/02291, filed on 20 Jun. 2001. Priority is claimed on that application and on the following application(s): Country: Germany, Application No.: 100 34 432.1, Filed: 10 Jul. 2000.

BACKGROUND OF THE INVENTION

1. Field of the Invention

The invention is directed to a distribution switch for sorting and guiding parts, particularly workpieces made of plastic, the switch having rods which are movable parallel to a principal axis and on which are arranged webs or paths which guide the parts in question into at least two different receiving elements so as to form a slope or leave an opening in the center, depending on a predeterminable position of the rods. The invention is also directed to a corresponding method for use of the switch.

2. Description of Prior Art

DE 299 06 636 U1 discloses a quality-grading switch for an injection molding machine in which a swivelable rocker is provided at a shaft. Plastics parts falling from the injection molding machine into a hopper opening are deflected to one side or the other depending on the position of the rocker.

Only two positions are possible in this quality-grading switch, and the whole rocker must always be moved when changing from one position to the other.

EP 0 589 543 A2 discloses a device for sorting and essentially vertically guiding workpieces and a frame which is rotatable about a horizontal axis. Paths which can be fastened to rods are articulated at the frame and can be tightened such that, in the work position, they extend above the associated sides to which they are not fastened and fill a hopper opening communicating with the production machine.

This sorting apparatus is disadvantageous in that the rotational angle of the frame for changing the respective sorting location is relatively large.

SUMMARY OF THE INVENTION

It is the object of the invention to provide a switch for sorting and guiding parts which is designed in a simple manner so as to enable a reliable sorting particularly of parts made of plastic in two directions or three directions by means of minor modifications.

According to the invention, the switch for sorting and guiding parts has rods which are movable axially parallel to one another and which correspond with guide elements through which they are movable substantially horizontally. Drive units are provided for the independently selectively moving the rods toward one another or away from one another along their longitudinal axes. Paths are formed in the manner of a fabric web or as telescoping plates, the length of which paths may be changed depending on the position of the rods.

Rotary motors, piston-cylinder units or linear motors are provided as drive units.

When linear motors are used, the rods are moved exactly horizontally. In another advantageous embodiment, the drive motors are connected to guide elements constructed as levers. Depending on the length of these levers, the rods move along circular arc segments with a relatively slight vertical alteration when changing position. In both of the embodiments mentioned above, the switch for sorting and guiding parts can be arranged close to the discharge element of the production machine.

In another embodiment form using levers and a rotary motor, the latter can be fastened directly to shafts which are mounted in swivel bearings. In this embodiment form, only one individual rotary motor is required for sorting two position variants and a total of two simple rotary motors are required when using three position variants.

In a particularly advantageous embodiment, only one motor is provided for selectively switching to three switch positions, this motor actuating driver pins which lean against the levers connected to the rods. Spring elements are provided as a counterforce against the pressing force of the driver pins.

In order to allow the motor to be stopped after the respective lever has moved into its sorting position, the invention is constructed in such a way that the driver pins are arranged in a rotating disk and elements are provided at the rotating disk by which its swiveling movement can be blocked. Blocking elements whose spring force can be overcome by the torque of the drive motor, spring-loaded blocking elements which are movable by excited magnets, or a self-locking motor gear unit (e.g., worm gear motor) can be used for this purpose.

The two lever rod units which are independent or which share only one swiveling axis are swivelable about a swiveling angle $\alpha$ of less than 80°. This is advantageous in that the respective sorting position can be reached in a very short time.

While the parts are being guided into the sorting position in which they are guided away from the central axis of the production machine toward the sides, the path has a relatively flat angle, so that the parts are guided substantially vertically in a relatively careful manner. This angle becomes appreciably steeper when changing to the next sorting position, so that the parts to be sorted that are still located on the path are clearly assisted in reaching their sorting position. This is particularly true for plastics parts which may possibly adhere to the path at a relatively flat angle.

The switch for sorting and guiding workpieces and the method, according to the invention, enable an arrangement that is closer to the workpiece discharge of the machine so that the fall height is advantageously reduced, making it unlikely that workpieces will miss their mark.

Further, the spring force required for moving the telescoping plates or for tightening the belts formed in the manner of a fabric is utilized to reinforce the respective drive unit at least in the path-shortening phase.

BRIEF DESCRIPTION OF THE DRAWINGS

An example of the invention is shown in the accompanying drawings in which.

DETAILED DESCRIPTION OF THE PREFERRED EMBODIMENTS

Figure 1A:
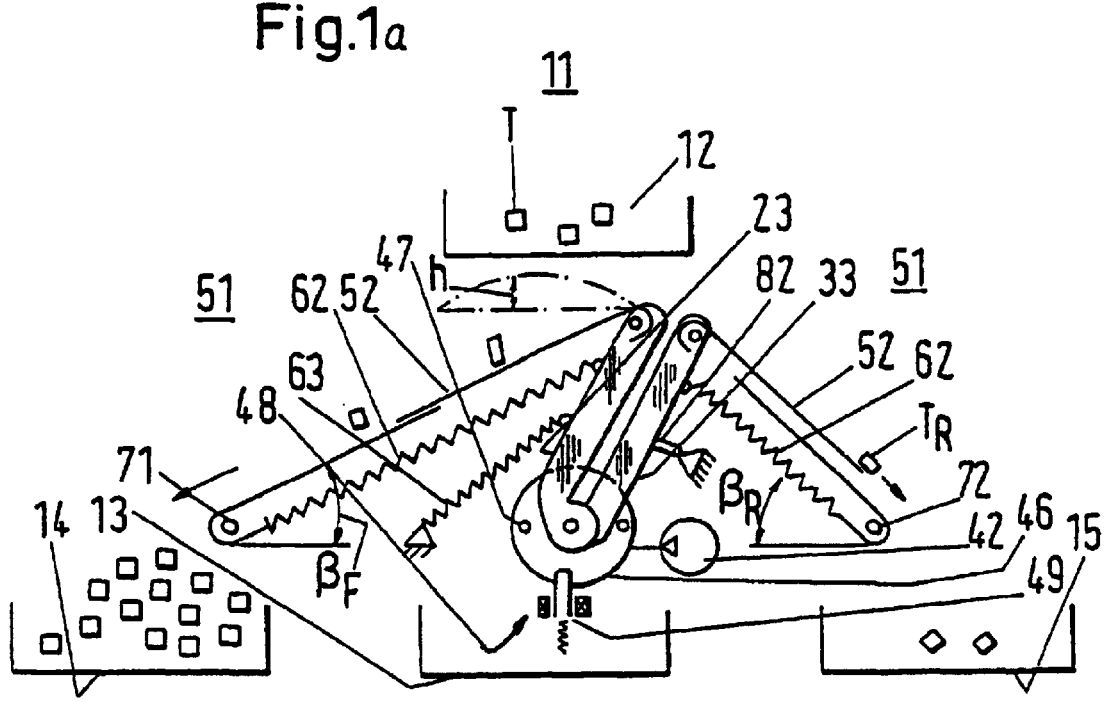
FIGS. 1a and 1b are a schematic side view and plan view showing a switch with levers which are driven by a motor by driver pins.

All of the drawings show a discharge element 12 which supplies parts T from a production machine 11, not shown in further detail, to a distribution switch having various paths 51. Depending on its position, the switch sorts the parts T into a central vessel 13 or into a first or second outer vessel 14, 15.

The switch includes rods 21, 31 which are connected to paths 51 which communicate at their other end with deflecting rollers 71, 72.

Figure 2A:
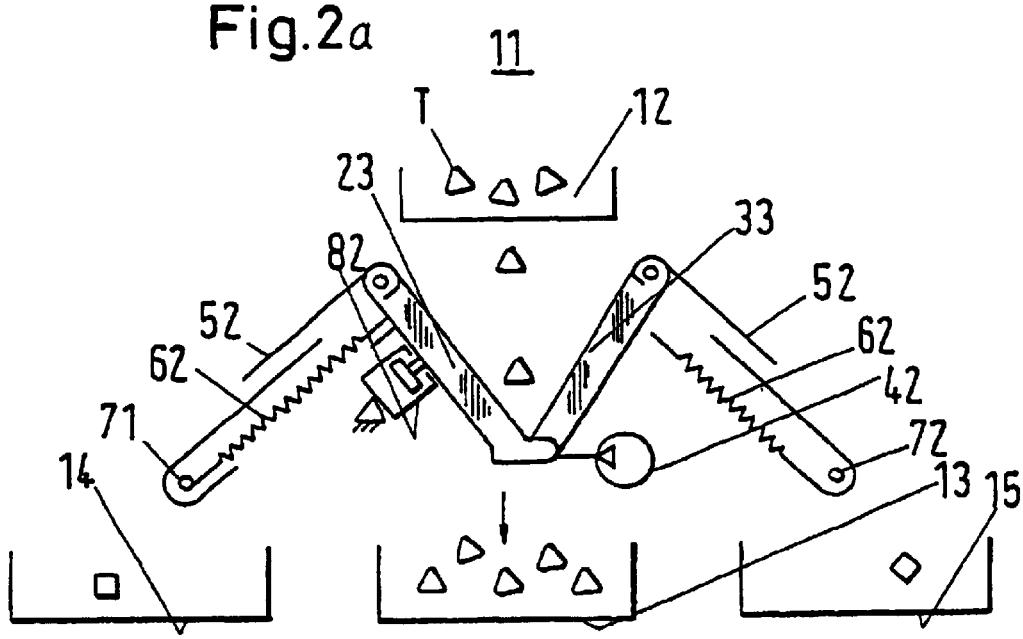
FIGS. 2a and 2b are a schematic side view and plan view showing a switch with levers driven by rotary motors.

In FIGS. 1a and 2a, the paths 51 are defined by telescoping plates 52 which are outfitted with springs 62.

Figure 3A:
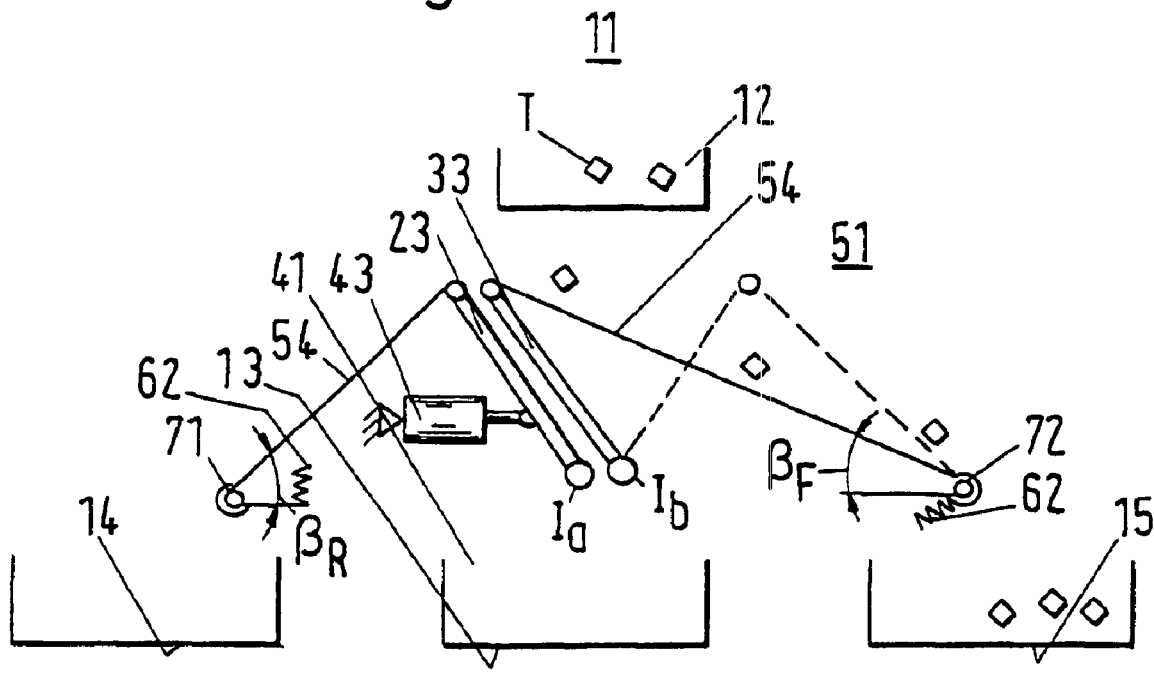
FIGS. 3a and 3b are a schematic side view and plan view showing a switch with levers driven by a piston-cylinder unit.
Figure 4A:
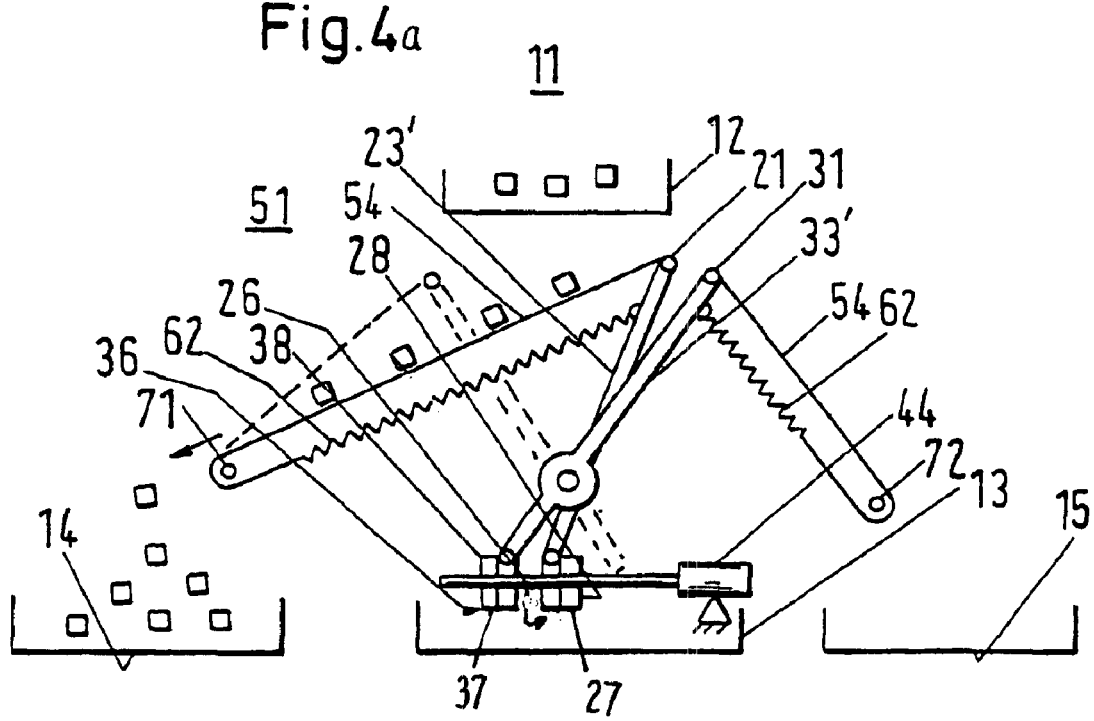
FIGS. 4a and 4b are a schematic side view and plan view showing a switch with levers driven by a spindle-nut unit.

In FIGS. 3a and 4a, the paths 51 are formed as fabric-like belts 54 which communicate with springs 62 which tighten the belts 54 in the various positions of the rods 21, 31.

Figure 5A:
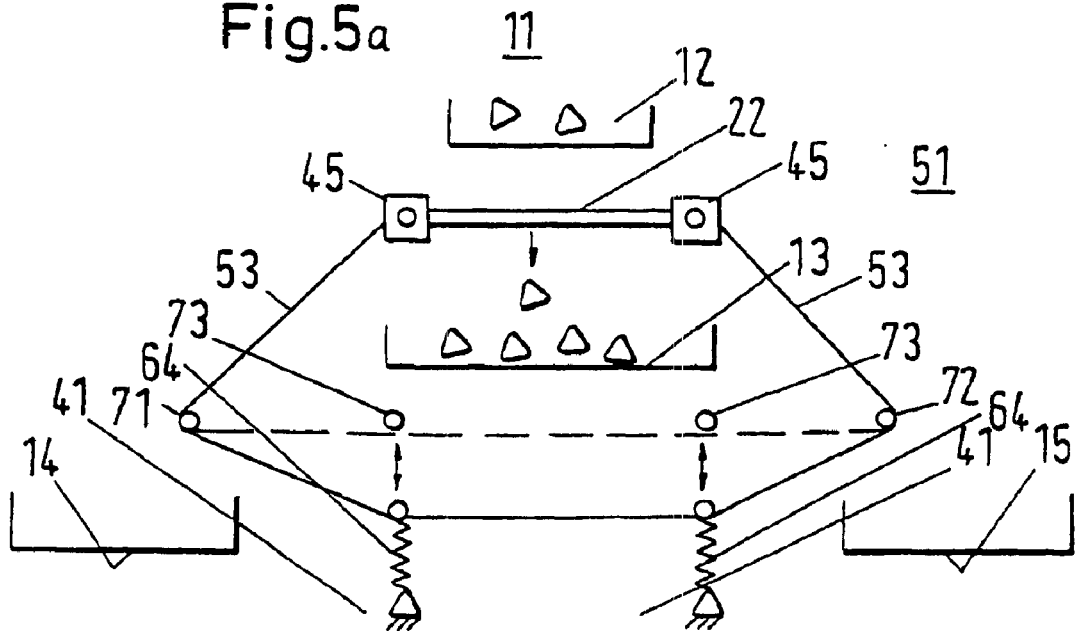
FIGS. 5a and 5b are a schematic side view and a plan view showing a switch driven by linear motors.

In FIG. 5a, a continuous belt 53, is one continuous belt connected between the rods 21, 31, defines paths 51 and can be tightened by tensioning rollers 73 connected to springs 64.

Figure 1B:
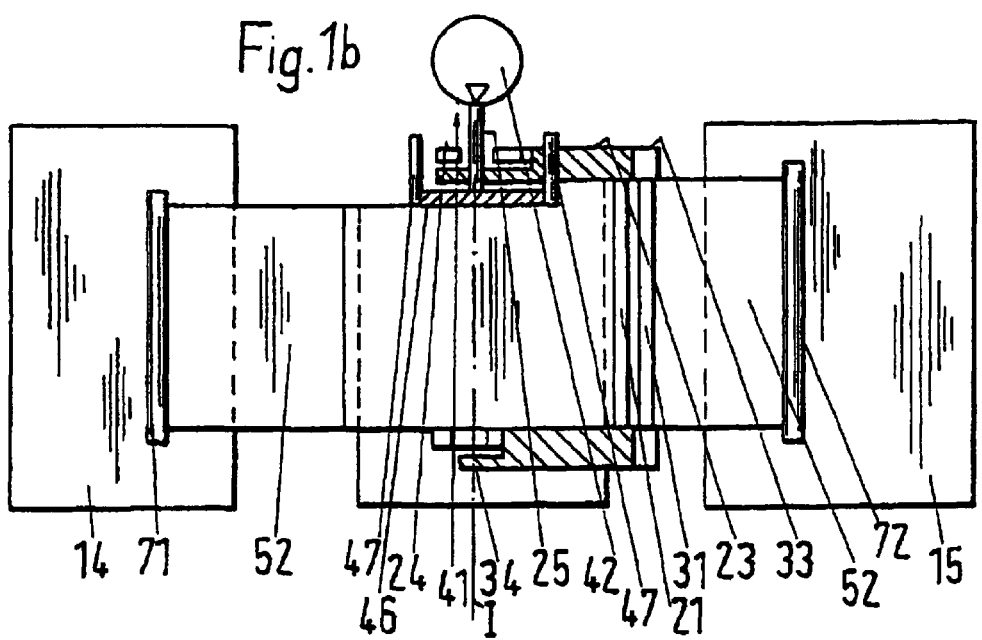

In FIGS. 1a and 1b, guide elements in the form of levers 23, 33 can be swiveled about a common swiveling axis I via swivel bearings 24, 34. A rotary motor 42 which drives a rotating disk 46 by a shaft 25 is provided as a drive unit 41. Driver pins 47 which lean against the respective lever 23 or 33 when rotation is carried out by the rotary motor 42 are provided at the rotating disk 46. The rotary motor 42 must overcome springs 62 when telescoping plates 52 are used and, as the case may be, springs 63 which are connected to the levers 23, 33. In the end position, the lever 33 leans against a bumper 82. In the interest of clarity, a bumper 82 is shown only for lever 33. However, a bumper may be arranged at the end position of both levers.

The switch shown in FIGS. 1a and 1b presents a position in which parts T are supplied by the discharge element 12 to an outer vessel 14 along the path 51 on the left side of FIGS. 1a and 1b. This left path 51 that is currently in operation has an angle of inclination $\beta_F$ which, is flatter than the corresponding angle $\beta_R$ of the path 51 on the right side of FIGS. 1a and 1b. Because of the steeper angle, a remaining part $T_R$ left over from the preceding sorting position of the switch on the right path 51 is effectively conveyed into the outer vessel 15. In a preferred embodiment, $\beta_F$=0.7 TO 0.9×$\beta_R$.

The levers 23, 33 are held in position by one of the driver pins 47 which are controlled by the operating rotary motor 42. In FIG. 1, the rotating disk 46 has a blocking element 48, in this case, a spring-loaded locking pin 49.

FIG. 1a further shows the height of the chord h indicating the distance between the horizontal line and the circular segment of the path described by the rods 21, 31 during the swiveling process about the swivel axis I.

Figure 2B:
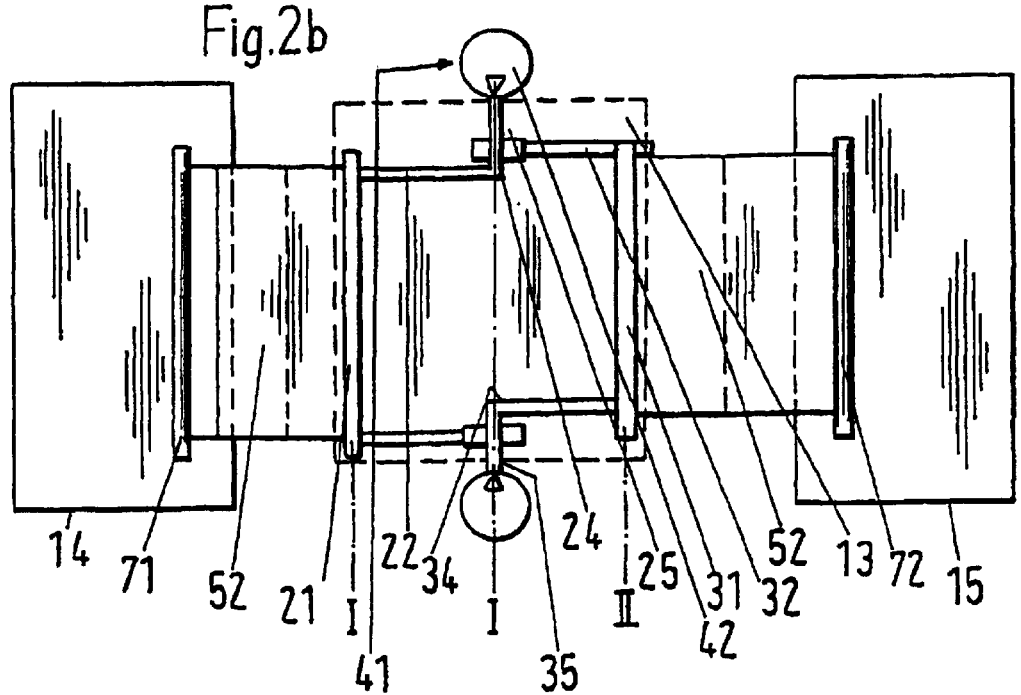

In FIGS. 2a and 2b, each of the levers 23, 33 which are swivelable about a common swiveling axis I is connected to a rotary motor 42 by respective shafts 25, 36 arranged on swivel bearings 24, 34.

The switch shown in FIGS. 2a and 2b is located in such a position that both levers 23 and 33 are open and the parts T to be sorted can be transported directly from the production machine 11 into the central vessel 13 by the discharge element 12.

Figure 3B:
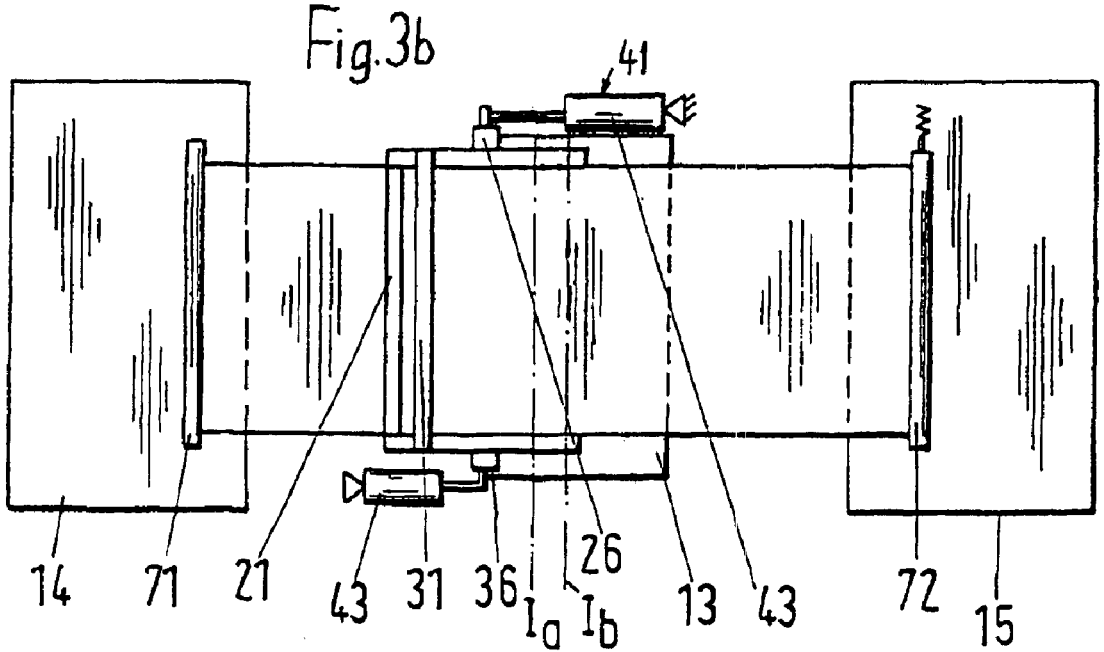

In FIGS. 3a and 3b, the levers 23, 33 connected to the rods 21, 31 are swivelable along parallel swiveling axes $I_a$ and $I_b$.

In the present case, the drive unit 41 is constructed as piston-cylinder units 43 which are connected to the levers 23, 33 by joints 26, 36.

In the present case, the path 51 shown on the right-hand side of the drawing has an angle of inclination $\beta_F$ which is smaller than the swiveling angle $\beta_R$ of the path on the opposite side.

Figure 4B:
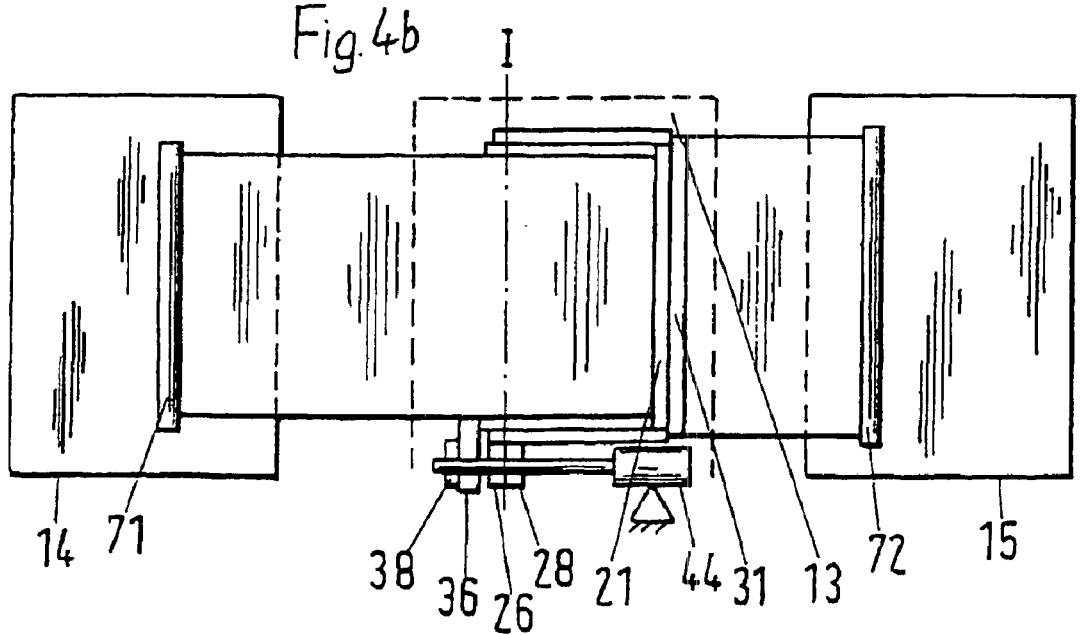

In FIGS. 4a and 4b, the guide elements for rods 21, 31 are constructed as two-armed levers 23', 33'. Joints 26, 36 which have nuts 27, 37 communicating with a spindle-nut unit 44 are arranged at the ends located opposite to the rods 21, 31.

In the present case, an individual spindle-nut unit 44 is provided. The operative connections of the nuts 27, 37 to the spindle-nut unit 44 can be switched on and off by clutches 28, 38 to actuate the individual levers 23', 33'.

Figure 5B:
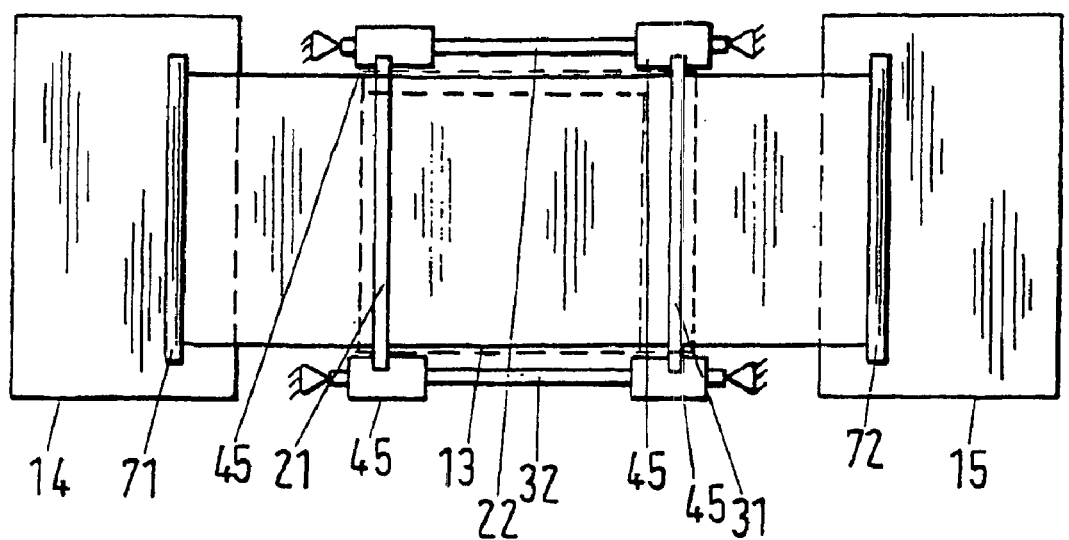

In FIGS. 5a and 5b, the rods 21, 31 have, at both ends, linear motors 45 which communicate with rod-shaped guide elements 22, 32.

A continuous belt 53 is provided to define the paths 51 and is guided below the central vessel 13. The continuous belt 53 can be tensioned corresponding to the position of the rods 21, 31 by tensioning rollers 73. The tensioning rollers 73 are connected to springs 64 in this case.

What is claimed is:

1. A switch for sorting and guiding parts received from a discharge element, said switch comprising:
   at least two receiving elements for receiving parts from the discharge element;
   path members having changeable lengths for guiding the parts from the discharge element toward one of said at least two receiving elements;
   first and second rods respectively connected to said path members and movable relative to each other such that they remain axially parallel to each other, said first and second rods arranged on guide elements actuatable for substantially horizontally moving said first and second rods, said first and second rods being movable for selectively forming a slope of said path members or defining an opening for guiding the parts received from the discharge element to one of said at least two receiving elements, wherein said lengths of said path members change based on positions of said respective first and second rods; and
   a drive unit operatively connected to said switch for selectively independently moving said first and second rods toward or away from each other.

2. The switch of claim 1, wherein each of said first and second rods comprise first ends, said guide elements comprising first and second levers respectively fastened to said first ends of said first and second rods, each of said first and second levers comprising swivel bearings arranged remote from said first and second rods such that said levers are swivelable, at least one of said first and second levers being in communication with the drive unit.

3. The switch of claim 2, wherein said drive unit comprises a rotary motor, said swivel bearings of said first and second levers being connected to said rotary motor.

4. The switch of claim 2, wherein said drive unit comprises a rotary motor, said switch further comprising pins connected to the rotary motor, said pins selectively leaning against said first and second levers for swiveling first and second levers in response to said rotary motor, and tension elements connected to said first and second levers acting against said pins.

5. The switch of claim 2, wherein said drive unit comprises a piston-cylinder unit and a joint arranged on at least one of said first and second levers, wherein said piston-cylinder is connected to said joint for moving said lever.

6. The switch of claim 2, wherein said drive unit comprises a spindle-nut unit and a joint comprising a nut connected to at least one of said first and second levers, wherein said piston-cylinder unit is connected to said nut of said joint.

7. The switch of claim 2, wherein said first and second levers are swivelable about a swiveling angle $\alpha$ of less than 80 degrees.

8. The switch of claim 6, wherein said joint further comprises a shiftable clutch.

9. The switch of claim 4, further comprising a rotating disk connected to said rotary motor for rotating about a swivel axis, said pins arranged at said rotating disk, and a blocking element for blocking the rotation of said rotating disk.

10. The switch of claim 9, wherein said blocking element is a spring-loaded locking pin.

11. The switch of claim 1, wherein said guide elements comprise rod-shaped elements, each of said first and second rods comprise first ends, and said drive unit comprises linear motors fastened to said first ends of said first and second rods.

12. The switch of claim 11, wherein said linear motors are movable along at least one of said rod-shaped elements.

13. The switch of claim 1, wherein each of said path members is further defined by plates which are telescopically displaceable relative to one another.

14. The switch of claim 13, further comprising springs connecting said plates of said each of said path members which are movable relative to one another.

15. The switch of claim 14, wherein said drive unit comprises a rotary motor, said switch further comprising pins connected to the rotary motor, said pins leaning against said first and second levers for swiveling first and second levers in response to said rotary motor, and said springs are further connected to said first and second levers for acting against said driver pins.

16. The switch of claim 1, further comprising a continuous belt comprising one continuous section arranged between said first and second rods and further defining said path members, at least two deflecting rollers for deflecting the continuous belt, and at least one tensioning roller for tensioning the continuous belt.

17. The switch of claim 1, wherein said switch is operable in a first operating mode in which one path member of said path members is an active path member arranged for guiding the parts received from the discharging element and another path member of said path members is an inactive path member arranged so that the inactive path member does not guide the parts received from the discharge element, said active path member being adjusted at an angle of inclination ($\beta_F$) that is flatter than the angle of inclination ($\beta_R$) of the inactive path member.

18. The switch of claim 17, wherein $\beta_F$=0.7 to 0.9×$\beta_R$.

* * * * *